Aug. 29, 1950  E. O. GILLEN  2,520,762
ROOM VENTILATOR
Filed June 26, 1946  3 Sheets-Sheet 1
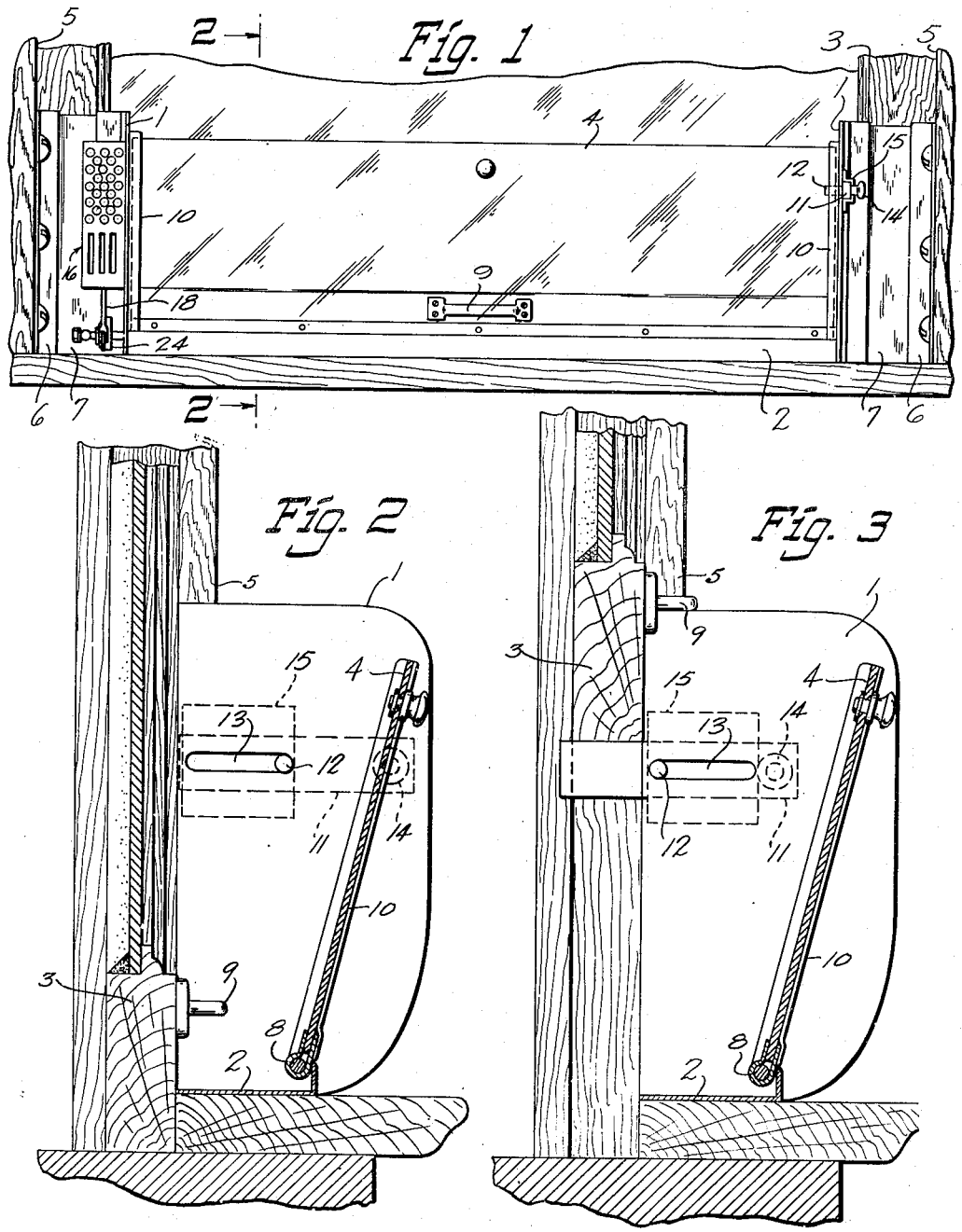
INVENTOR.
Eugene O. Gillen
BY
Attorney Aug. 29, 1950     E. O. GILLEN     2,520,762
ROOM VENTILATOR
Filed June 26, 1946     3 Sheets-Sheet 2
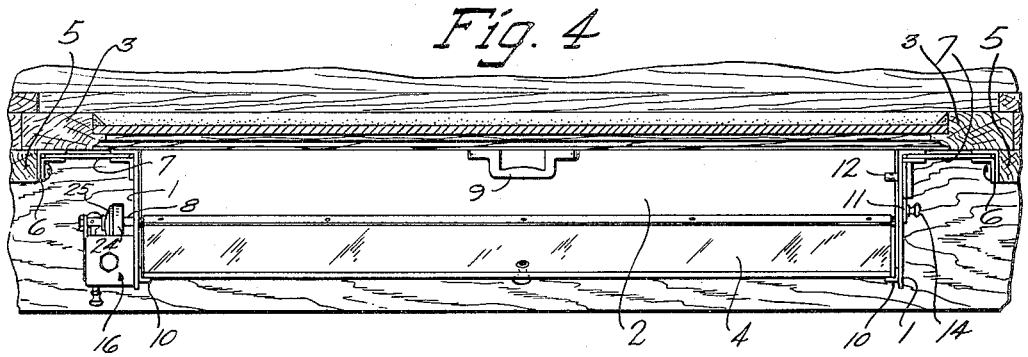
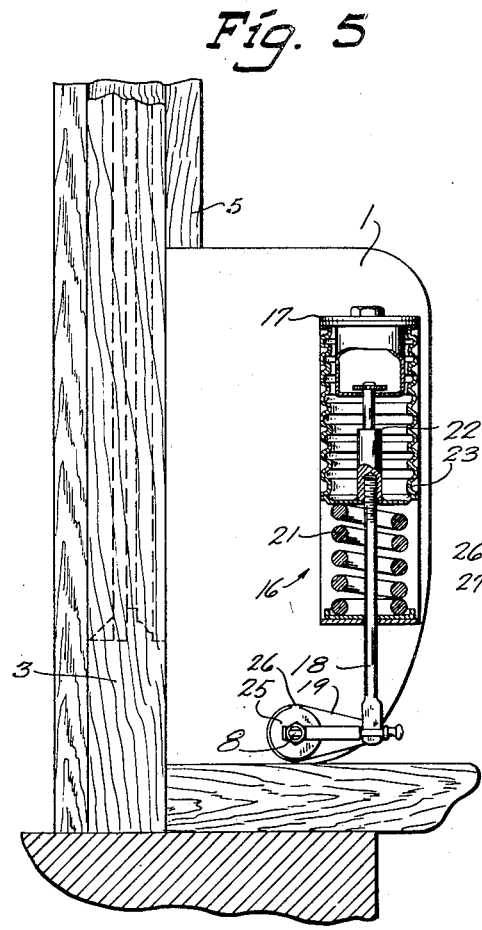
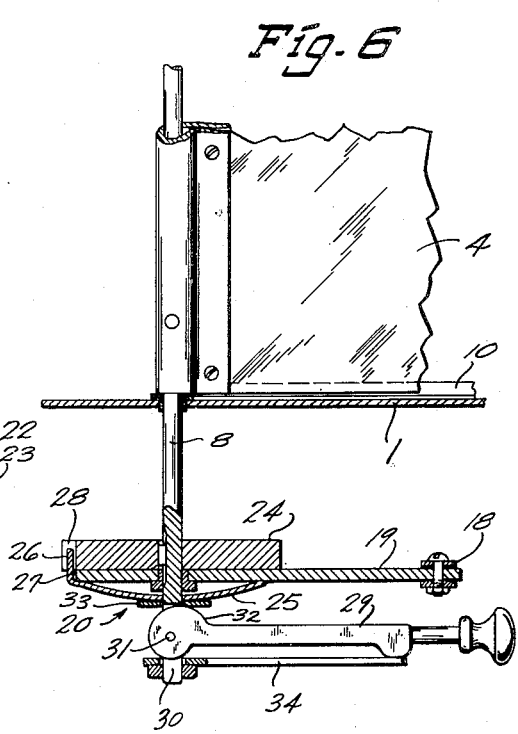
INVENTOR.
Eugene O. Gillen
BY
Attorney

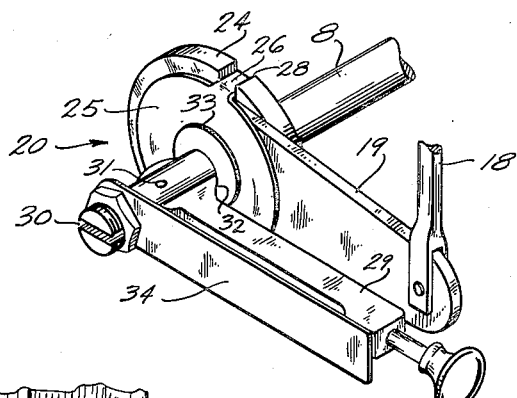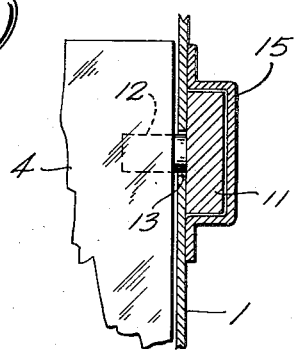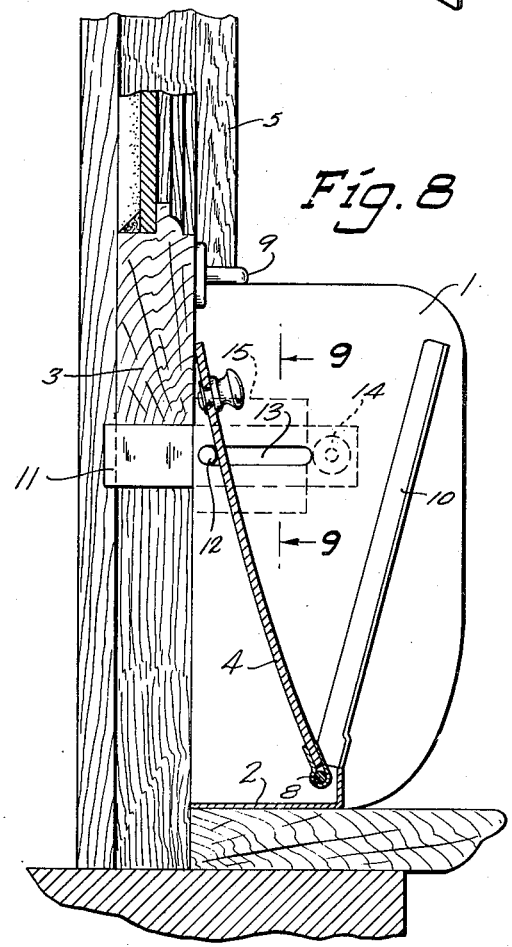

Patented Aug. 29, 1950

2,520,762

UNITED STATES PATENT OFFICE 2,520,762

ROOM VENTILATOR

Eugene O. Gillen, Milwaukee, Wis.

Application June 26, 1946, Serial No. 679,315

14 Claims. (Cl. 236—49)

This invention relates to a room ventilator which may be installed on the inside sill of a window for automatically regulating the passage of air therethrough and determining the temperature within a ventilated room or the like.

Ventilators of this general type which have been proposed heretofore have involved the use of louvers which substantially restrict the opening at all times, and which had to have a fixed seal against the window sash that restricted access to the lower sash and prevented use of hand grips on the sash for raising and lowering the latter.

The principal object of the present invention is to provide a simple low cost automatic room ventilator which is durable and serviceable.

Another object of the invention is to provide a thermostatically operated single vane type ventilator in which the vane may be moved away from the window sash regardless of the position of the thermostat, thereby preventing injury to the vane when the window is moved up or down.

Another object is to provide such a ventilator in which the operating connection between the thermostat and the vane may be readily adjusted and set to provide for an initial temperature control of the room within the limits of the operating range of the thermostat.

Another object is to provide such a ventilator with an automatic relief for the operating connection between the thermostat and the vane whereby the force exerted by the thermostat to close the ventilator will never exceed a predetermined amount regardless of further movement of the thermostat beyond that necessary to effect closing of the ventilator by the vane.

Another object is to provide a simple slip-clutch mechanism for connecting the thermostat to the vane and which may be temporarily manually released for movement of the vane independently of the thermostat.

Another object is to provide such a clutch mechanism which is normally engaged to transmit movement of the thermostat to the vane and which, when manually released, automatically returns to normal engagement upon removal of the hand of the operator therefrom.

Another object is to provide a thermostatically operated ventilator with a releasable clutch interconnecting the thermostat and ventilator closing means permitting setting of the closing means at any position relative to the thermostat, and which automatically provides for the return of the setting to a predetermined position for the closure means relative to the thermostat during operating of the ventilator.

Another object is to provide a releasable slip-clutch mechanism for connecting the thermostat to the vane and which is safe against meddling by children and the like.

Another object is to provide a more powerful thermostatic operation of a ventilator having a large single vane whereby the position of the vane may be more accurately held against wind pressures and rapid variations in air movements through the ventilator.

Another object is to provide a powerful thermostatically operated ventilator with means to prevent injury to the closure means and to the thermostat where the latter moves beyond the point necessary for closing the ventilator, and in which the thermostat maintains a predetermined sealing force upon the closure.

Another object is to provide a ventilator of the single vane type wherein the window cannot be closed when the vane is closed against the window sash.

Another object is to provide a ventilator of the single vane type in which the vane is flexible to provide a reserve movement effecting a seal of the same against the window sash, thereby preventing flutter from high winds and from opening or closing of the room door.

Another object is to provide a ventilator of this type which is less noisy and in which the seal of the vane against the window sash is soft and not apt to effect flutter noises which might awaken a sleeper in the room.

Another object is to provide a ventilator in which greater space is provided adjacent the window sash when the latter is closed so that an operator's hand may readily grasp a handle on the sash to raise the same.

Other and more specific objects and advantages will appear in the description of an embodiment of the invention illustrated in the accompanying drawings.

In the drawings:

Figure 1 is a front elevation of the ventilator shown in place on a window sill and with the window closed;

Fig. 2 is a vertical transverse section taken on line 2—2 of Figure 1;

Fig. 3 is a similar section showing the window sash open for ventilating a room;

Fig. 4 is a plan view of the ventilator;

Fig. 5 is an end elevation of the ventilator with the thermostat cover removed and showing the clutch for operating the vane;

Fig. 6 is a horizontal axial section through the end of the vane shaft and clutch showing the release mechanism for the latter;

Fig. 7 is a perspective view of the clutch and release mechanism;

Fig. 8 is a detail view showing the lock for preventing closing of the window sash when the vane is closed against the window; and Fig. 9 is a detail section taken on line 9—9 of Fig. 8.

The room ventilator is adapted to be employed in the ventilation of bedrooms, offices and the like in the winter, where it is desired to prevent cooling of the room below a predetermined temperature. For this purpose the ventilator opening is thermostatically controlled to close the same when the temperature of the room air approaches a predetermined low temperature.

The ventilator comprises in general, end frame uprights 1 joined at the bottom by a base 2 and defining with the window sash 3 a ventilating opening which is controlled by the closure means 4.

The frame uprights 1 are secured in spaced relation to the corresponding sides of the window frame 5 by means of end closures 6 which are flanged inwardly to provide for fastening to the window frame by screws.

The base 2 is generally of standard length, and the ventilator may be made to fit windows of different widths by providing interchangeable intermediate panel sections 7 of the necessary widths to complete the closure, and adapted to slide vertically into position by means of slip joints between the panel sections and the corresponding end frames and end closures.

The single closure means or vane 4 is fixed at its lower edge upon a shaft 8 extending along the base 2 and pivotally mounted in bearings in end frame 1 through which the shaft passes.

The vane 4 extends for the full length of the space between end frame 1, and its lower edge is spaced inwardly from the window sash 3 so that when the vane is pivoted inwardly from the window adequate space is provided for the hands of an operator to enter between the vane and the sash and grasp the usual handle 9 for lifting the sash.

The height of the vane 4 and of the end frames 1 and end closures 6 is sufficient to provide for a substantial opening of the window by raising of sash 3 when the ventilator is to be operated. Generally from six to ten inches is adequate height for the purpose.

The vane 4 pivots from a wide open position, where it is angularly disposed toward the room with its ends lying against flanges 10 on the end frames 1 and which serve as stops for the vane, to a closed position, where its upper edge is pressure sealed against the open lower window sash 3 and the vane is angularly disposed toward the window.

When the window is raised to operative ventilation position a slide 11 which is carried by and adjacent an end frame 1 between the frame and the window casing may be pushed outwardly to limit downward movement of the window sash 3 and thereby protect the vane 4 from injury should the sash 3 lower and handle 9 engage the upper end of the vane.

An abutment 12 on the slide 11 extending through a horizontal slot 13 in the end frame, is disposed between the vane 4 and the window to make sure that the vane 4 is moved inwardly sufficiently to clear handle 9 when the slide 11 has moved inwardly sufficient to clear the sash 3 for lowering of the latter.

In opening the ventilator for operation the slide 11 must be moved outwardly beneath the window sash 3 before the vane can be operated to close the opening and seal against the sash.

The slide 11 may be operated by means of a knob 14 at the outer end of the slide. The slide 11 may be secured to the frame 1 by means of a channel clip 15 through which the slide operates.

The operation of vane 4 to automatically open and close the ventilator opening in accordance with temperature changes of the room air is effected by means of a bellows type thermostat 16 constructed to provide a high operating force over a relatively long movement.

The thermostat 16 is mounted at the end of the ventilator opposite slide 11, between end frame 1 and the window frame 5, and is preferably disposed vertically near the front of the ventilator where it is in the path of secondary air movement of the room air upwardly past the front of the ventilator.

The thermostat 16 is mounted in a flanged bracket 17 with the upper end of the bellows of the thermostat fixed to the upper flange of the bracket, and with the lower end of the bellows free to move up and down in accordance with the vertical contraction and expansion of the bellows under the influence of thermal volumetric changes in the fluid medium sealed in the bellows.

An operating rod 18 extends downwardly from the free end of the bellows and is connected to the vane shaft 8 by means of the horizontal lever arm 19 and clutch 20.

The lever arm 19 has a length determined by the necessity of moving the vane 4 through its total required movement from wide open to closed position by the contracting movement of the bellows determined by a drop of about 30° in the room temperature.

The bellows of the thermostat 16 is pre-loaded by means of a heavy coil spring 21, mounted between the lower free end of the bellows and the lower flange on bracket 17, and which tends to contract the bellows with a predetermined force.

When the bellows expands against spring 21 by reason of a thermal expansion of the fluid within the bellows effected by a raise in temperature of the room air, the operating rod 18 is moved downwardly thereby pivoting vane 4 inwardly away from sash 3 to open the ventilator.

When the bellows contracts by reason of a lowering of the room temperature by mixture with cool outside air or other cause, the spring 21 exerts a strong force moving rod 18 upwardly and pivoting vane 4 toward closed position.

The vane 4 is made of a flexible resilient and preferably transparent set plastic such as commercial forms of acrylic resins and the like, and when the vane engages sash 3 in its closing movement the vane flexes and curves outwardly under the force applied thereto by spring 21 upon the continued contraction of the bellows.

An internal stop 22 is provided inside the bellows to limit the contraction of the bellows beyond about 30° F. and prevent injury to its corrugations or flutes 23. This same stop 22 limits the continued upward movement of rod 18 after vane 4 engages sash 3 so that the maximum possible forces applied to flex the vane are thereby limited.

The bellows is preferably constructed to limit the expansion movement obtainable, corresponding to a temperature of about 80° F. so that above that temperature no further pressure is applied to move the vane 4.

The construction of the thermostat provides an operative range of temperature for vane 4 from about 40° F. to about 70° F.

The clutch 20 is provided to effect a release of vane 4 from the forces of the thermostat 16 and spring 21 when it is desired to move the vane manually away from the window sash 3 for adjusting the position of the vane or for lowering or raising of the window.

The clutch 20 is adapted to slip under a predetermined load so that the vane 4 and its operating mechanism cannot be injured if it is displaced from its normal operative position relative to the position of rod 18 or purposefully set at a predetermined position, upon manual release of the clutch.

This slipping of the clutch provides an automatic re-setting of vane 4 while in operation to normal position from any position of previous setting or adjustment and makes it unnecessary to carefully reset or adjust the vane after its displacement upon manual release of the clutch.

The clutch 20 comprises, in general, a circular plate 24 fixed on shaft 8 and frictionally engaged by the circular base of lever arm 19 under the biasing influence of a dished spring 25.

The lever arm 19 is preferably of organic fiber composition or resin impregnated fiber construction to provide a relatively high coefficient of friction with the metal of disc 24.

The dome shaped spring 25 has its perimeter engaging the outside of arm 19 and biasing the arm against disc 24. The spring 25 has an ear or lug 26 extending laterally from its outer edge across a recess 27 in the edge of arm 19 and into a recess 28 in disc 24 so that the spring 25 is prevented from turning with arm 19 and provides additional frictional resistance to clutch slippage. The recess 27 in the edge of the circular base of arm 19 extends circumferentially of the base a distance equal to that desired for maximum turning of vane 4 at any position of the latter when the clutch is released.

The spring 25 is tightened upon the clutch members 19 and 24 automatically by means of the spring pressed lever 29 which extends radially from shaft 8 and has its inner end loosely fitting in a slot 30 through the shaft and pivoted upon a pin 31 passing through the shaft and lever.

The inner end of lever 29 has an eccentric cam surface 32 facing and bearing against a central washer 33 on spring 25 to hold the spring in engagement with the clutch member 19. When lever 29 is manually pivoted outwardly away from the clutch and end frame, the cam 32 recedes and relieves spring 25 of pressure, thereby loosening the clutch members 19 and 24 and allowing vane 4 to move freely and independently of the position of thermostat 16.

The lever 29 is normally biased toward the clutch, to effect a predetermined tightening of the latter, by cam 32 and spring 25, by means of a simple leaf spring 34 suitably secured on the end of shaft 8 and bearing against the outer end of lever 29 with the required force to maintain the clutch at a predetermined desired slip tightness.

The construction provides an automatic predetermined tightening of the clutch upon release of lever 29 by the hand, to effect holding of the vane 4 at any desired position relative to the thermostat 16.

The ventilator is preferably constructed to provide a thermostat operating range of about 30°, generally between about 40° and 70°. When the thermostat responds to room air of about 70° temperature the vane 4 is held open against flanges 10 which provides the maximum opening for the ventilator. When the thermostat responds to room air of about 40° temperature the vane 4 is closed against the window sash 3 which closes the ventilator.

When the vane 4 is moved away from the sash 3 manually upon release of the clutch, for the purpose of opening the window, it is possible to set the vane 4 at any position desired regardless of the temperature of the room air effecting thermostat. If, for instance, the room air is at 70° and it is desired to close the ventilator at about 55°, the vane 4 may be set at about midway between the sash 3 and flanges 10. Then, as the thermostat bellows contracts to a point corresponding to room air of about 55°, it will move the vane 4 toward and into engagement with the sash 3, thereby closing the ventilator.

Further possible lowering of the room air temperature will first effect flexing of vane 4 to pre-load the same, and hold the vane tightly sealed against the sash. After a given flexing of vane 4 is reached, the clutch 20 will start slipping and further movement of rod 18 by thermostat 16 will not result in any further pressure upon vane 4. If the room air should lower to about 35° the vane 4 will have reached its normal position of closure for which the ventilator was constructed.

Thereafter, any rise in temperature of the room air will first result in the removal of the pre-load curvature of vane 4, and then at about 40° in an opening movement of the vane 4 away from the sash 3.

The above described automatic setting of the vane 4 is operative in like manner at the opposite phase of the cycle. For instance, if the room air is at 40° and it is desired to have the ventilator wide open at 55°, the vane 4 may be set at about midway between the sash 3 and flanges 10. Then, as the thermostat bellows expands to a point corresponding to room air of 55°, it will move the vane 4 toward and into engagement with the stop flanges 10 on the end frames.

Further possible rising of the room air temperature will result in slipping of clutch 20 which serves to protect the vane 4 and the thermostat bellows from injury.

The ventilator is adapted to be positioned on the inner sill of the window and to remain there at all times. In the summer it may remain open and serves as a shield to control the ventilation of the room and prevent rain from entering. In the winter it additionally functions to control the temperature of the room as described.

The single vane, being pivoted at its lower edge, is free of possible restriction in movement by snow collecting on the base of the ventilator, and will pivot as described regardless of weather conditions.

High wind pressures which may cause temporary fluttering of the vane, and door opening and closing in the room which may cause similar fluttering of the vane, do not result in serious noise apt to awake an occupant of the room. The flexible vane 4, being made of plastic is quiet when hitting against the sash 3, as distinguished from a more rigid board, glass or metal vane.

The transparency of the vane allows light to enter, as though through the window glass, a feature important in many uses of the ventilator.

By providing a set plastic vane, as described, the lightness of the vane avoids any heavy load upon the thermostat, particularly at or near the ends of the stroke, as when the vane closed or wide open. A more uniformly accurate movement of the vane is thereby obtained in proportion to temperature changes.

The ventilator may have various embodiments within the scope of the accompanying claims.

I claim:

1. A room ventilator of the class described adapted to be mounted on the inner sill of a window without interference with the raising and lowering of the window sash, comprising a pair of end frames, a single vane extending between said end frames and pivoted along its bottom edge to move between a closed position where its upper edge is sealed against the window sash and an open position where it admits air upwardly between the window sash and vane, the vane having its lower edge disposed inwardly from the window sash and substantially sealed with relation to the window sill, a rotary shaft extending through one of said end frames and secured to said vane to rotate with the pivotal movement of the vane, a thermostat disposed in the room and carried by said latter end frame for operating said vane in response to temperature changes of the room air, and means connecting said thermostat to said shaft to effect operation of said vane.

2. A room ventilator of the class described adapted to be mounted on the inner sill of a window without interference with the raising and lowering of the window sash, comprising a pair of end frames, a single closure means pivoted near the bottom of said end frames and disposed to move toward the window to seal one edge of the means against the window sash when closing the ventilator and to move away from the window to open a ventilating air passage upwardly inside the window, a pivotal shaft extending through one of said end frames to operate said closure, a thermostat disposed in the room and connected to said shaft to operate the latter in response to temperature changes of the room air to thereby control the position of said vane.

3. A room ventilator of the class described adapted to be mounted on the inner sill of a window without interference with the raising and lowering of the window sash, comprising a pair of end frames, a single vane extending between said end frames and pivoted along its bottom edge to move between a closed position where its upper edge is sealed against the window sash and an open position where it admits air upwardly between the window sash and vane, the vane having its lower edge disposed inwardly from the window sash and substantially sealed with relation to the window sill, said vane when in open position being sufficiently spaced from the window sash to clear any handle thereon and provide ready access to the sash for raising and lowering of the same, thermostatic means disposed in the room and connected to said vane to operate the latter in response to temperature changes of the room air, and manually operable means to release said vane from thermostatic control to provide for free manual operation of the vane to open position for the operation of said window sash.

4. A room ventilator of the class described adapted to be mounted on the inner sill of a window without interference with the raising and lowering of the window sash, comprising a pair of end frames, a single vane extending between said end frames and pivoted along its bottom edge to move between a closed position where its upper edge is sealed against the window sash and an open position where it admits air upwardly between the window sash and vane, the vane having its lower edge disposed inwardly from the window sash and substantially sealed with relation to the window sill, said vane when in open position being sufficiently spaced from the window sash to clear any handle thereon and provide ready access to the sash for raising and lowering of the same, and a stop operable by movement of said vane toward the window sash to prevent closing of the window when said vane is sufficiently close to the sash to be caught by handles thereon and injured.

5. A room ventilator of the class described adapted to be mounted on the inner sill of a window without interference with the raising and lowering of the window sash, comprising a pair of end frames, a single vane extending between said end frames and pivoted along its bottom edge to move between a closed position where its upper edge is sealed against the window sash and an open position where it admits air upwardly between the window sash and vane, the vane having its lower edge disposed inwardly from the window sash and substantially sealed with relation to the window sill, said vane when in open position being sufficiently spaced from the window sash to clear any handle thereon and provide ready access to the sash for raising and lowering of the same, thermostatic means disposed in the room and connected to said vane to operate the latter in response to temperature changes of the room air, manually operable means to release said vane from thermostatic control to provide for free manual operation of the vane to open position for the operation of said window sash, and means preventing closing of the window when said vane is sufficiently close to the sash to be caught by handles thereon and injured.

6. A room ventilator of the class described adapted to be mounted on the inner sill of a window without interference with the raising and lowering of the window sash, comprising a pair of end frames, a single vane extending between said end frames and pivoted along its bottom edge to move between a closed position where its upper edge is sealed against the window sash and an open position where it admits air upwardly between the window sash and vane, the vane having its lower edge disposed inwardly from the window sash and substantially sealed with relation to the window sill, thermostatic means disposed in the room and carried by one of said end frames for operating said vane in response to temperature changes of the room air, and a slip clutch connecting said thermostat to said vane and adapted to protect the vane and thermostat against injury from temperature variations beyond those necessary for operation of the vane.

7. A room ventilator of the class described adapted to be mounted on the inner sill of a window without interference with the raising and lowering of the window sash, comprising a pair of end frames, a single vane extending between said end frames and pivoted along its bottom edge to move between a closed position where its upper edge is sealed against the window sash and an open position where it admits air upwardly between the window sash and vane, the vane having its lower edge disposed inwardly from the window sash and substantially sealed with relation to the window sill, thermostatic means disposed in the room and carried by one of said end frames for operating said vane in response to temperature changes of the room air, a slip clutch connecting said thermostat to said vane and adapted to protect the vane and thermostat against injury from temperature variations beyond those necessary for operation of the vane, and manually operable means to temporarily release said clutch and provide for free adjustment of said vane to any position.

8. A room ventilator of the class described adapted to be mounted on the inner sill of a window without interference with the raising and lowering of the window sash, comprising a pair of end frames, a single vane extending between said end frames and pivoted along its bottom edge to move between a closed position where its upper edge is sealed against the window sash and an open position where it admits air upwardly between the window sash and vane, the vane having its lower edge disposed inwardly from the window sash and substantially sealed with relation to the window sill, thermostatic means disposed in the room and carried by one of said end frames for operating said vane in response to temperature changes of the room air, a slip clutch connecting said thermostat to said vane and adapted to protect the vane and thermostat against injury from temperature variations beyond those necessary for operation of the vane, and manually operable means to temporarily release said clutch and provide for free adjustment of said vane to any position, said clutch being normally engaged to provide for thermostatic control of the vane during ventilation and being adapted to slip under a predetermined load to hold said vane closed against the window sash under a given sealing pressure when the ventilator is closed by the thermostat.

9. A room ventilator of the class described adapted to be mounted on the inner sill of a window without interference with the raising and lowering of the window sash, comprising a pair of end frames, a single vane extending between said end frames and pivoted along its bottom edge to move between a closed position where its upper edge is sealed against the window sash and an open position where it admits air upwardly between the window sash and vane, the vane having its lower edge disposed inwardly from the window sash and substantially sealed with relation to the window sill, and a thermostat connected to said vane to operate the same, said vane being of flexible resilient material to cushion the movement of said thermostat when the vane engages the window sash.

10. A room ventilator of the class described adapted to be mounted on the inner sill of a window without interference with the raising and lowering of the window sash, comprising a pair of end frames, a single vane extending between said end frames and pivoted along its bottom edge to move between a closed position where its upper edge is sealed against the window sash and an open position where it admits air upwardly between the window sash and vane, the vane having its lower edge disposed inwardly from the window sash and substantially sealed with relation to the window sill, thermostatic means disposed in the room and carried by one of said end frames for operating said vane in response to temperature changes of the room air, a slip clutch connecting said thermostat to said vane and adapted to protect the vane and thermostat against injury from temperature variations beyond those necessary for operation of the vane, and manually operable means to temporarily release said clutch and provide for free adjustment of said vane to any position, said clutch being normally engaged to provide for thermostatic control of the vane during ventilation and being adapted to slip under a predetermined load to hold said vane closed against the window sash under a given sealing pressure when the ventilator is closed by the thermostat, said vane being of set plastic material.

11. A room ventilator adapted to be mounted on the inner sill of a window without interference with the raising and lowering of the window sash, comprising a frame to be secured in front of a window and having an opening therethrough for ventilating air, said frame being sealed with the window sill and at its ends to the window frame, a closure for said opening operable between fully open and closed positions, a thermostat disposed in the room and connected to said closure to operate the same in response to temperature changes in the room air, and a slip clutch interposed in the connection between said thermostat and closure to protect said closure and thermostat from injury when temperature changes in the room exceed those necessary for operation of said closure, said slip clutch comprising two frictionally engaged members and means biasing the same together under a substantially constant manually releasable pressure whereby said frictionally engaged members continue to transmit forces to said closure member to hold the same against wind pressures after closure and during slippage of said members.

12. A room ventilator adapted to be mounted on the inner sill of a window without interference with the raising and lowering of the window sash, comprising a frame to be secured in front of a window and having an opening therethrough for ventilating air, said frame being sealed with the window sill and at its ends to the window frame, a closure for said opening operable between fully open and closed positions, a thermostat disposed in the room and connected to said closure to operate the same in response to temperature changes in the room air, and a stress relief mechanism associated with the connection between said thermostat and closure to protect said closure and thermostat from over-stress when temperature changes in the room exceed those necessary for operation of said closure, said stress relief mechanism comprising a yieldable connection which maintains the closure force upon said closure member to hold the latter against wind pressures during yielding of the connection and manual releasing means for said yieldable connection whereby the relative positions of the closure member and thermostat may be re-set.

13. A room ventilator adapted to be mounted on the inner sill of a window without interference with the raising and lowering of the window sash, comprising a frame to be secured in front of a window and having an opening therethrough for ventilating air, said frame being sealed with the window sill and at its ends to the window frame, a closure for said opening operable between fully open and closed positions, a thermostat disposed in the room and connected to said closure to operate the same in response to temperature changes in the room air, and stress relief means disposed to be operated upon said closure reaching fully closed position to relieve said thermostat of stress where the room temperature continues to change and to operate said thermostat, said stress relief means comprising a manually settable yieldable connection between the thermostat and closure which maintains the closure against wind pressures at all times during yielding of the connection.

14. A room ventilator adapted to be mounted on the inner sill of a window without interference with the raising and lowering of the window sash, comprising a frame to be secured in front of a window and having an opening therethrough for ventilating air, said frame being sealed with the window sill and at its ends to the window frame, a pivotally mounted closure vane for said opening operable toward and away from the window sash between fully open and closed positions and adapted to engage the window sash under pressure when closed, a thermostat disposed in the room and connected to said closure vane to operate the same in response to temperature changes in the room air, and said closure vane being flexible to resiliently absorb additional stress resulting from the continued operation of said thermostat in the direction of closing said closure after the latter has reached its fully closed position.

EUGENE O. GILLEN.

REFERENCES CITED

The following references are of record in the file of this patent:

UNITED STATES PATENTS

| Number | Name | Date |
|---|---|---|
| Re. 19,728 | Dintilhac | Oct. 22, 1935 |
| 216,313 | Crouch | June 10, 1879 |
| 802,477 | Robertshaw | Oct. 24, 1905 |
| 995,237 | Esender | June 13, 1911 |
| 1,234,925 | Moss | July 31, 1917 |
| 1,358,193 | Fulton | Nov. 9, 1920 |
| 1,477,277 | Milker | Dec. 11, 1923 |
| 1,480,902 | Hall | Jan. 15, 1924 |
| 1,650,724 | Rose | Nov. 29, 1927 |
| 1,776,370 | Proctor | Sept. 23, 1930 |
| 1,813,629 | Lumley | July 7, 1931 |
| 1,847,911 | Trane | Mar. 1, 1932 |
| 2,060,185 | Eggleston | Nov. 10, 1936 |
| 2,316,309 | Blain | Apr. 13, 1943 |